United States Patent [19]

Cross

[11] Patent Number: 5,600,549
[45] Date of Patent: Feb. 4, 1997

[54] POWER FACTOR CORRECTED ELECTRICAL POWER CONVERTER

[75] Inventor: David A. Cross, Sandy Beds, United Kingdom

[73] Assignee: Astec International, Ltd., Hong Kong, Hong Kong

[21] Appl. No.: 309,112

[22] Filed: Sep. 20, 1994

[51] Int. Cl.$^6$ ................................... H02M 1/12
[52] U.S. Cl. ................ 363/46; 363/45; 323/285
[58] Field of Search ................. 363/44, 45, 46, 363/47, 48; 323/282, 283, 284, 285

[56] References Cited

U.S. PATENT DOCUMENTS

| | | | |
|---|---|---|---|
| 3,913,002 | 10/1975 | Steigerwald et al. | 363/18 |
| 5,351,162 | 9/1994 | Koishikawa | 361/18 |
| 5,367,247 | 11/1994 | Blocher et al. | 323/284 X |
| 5,428,286 | 6/1995 | Kha | 323/285 |

FOREIGN PATENT DOCUMENTS

| | | |
|---|---|---|
| 0496529A2 | 7/1992 | European Pat. Off. . |
| 0605330A2 | 7/1994 | European Pat. Off. . |
| 62-277075 | 12/1987 | Japan . |

Primary Examiner—Robert Nappi
Assistant Examiner—Y. J. Han
Attorney, Agent, or Firm—Coudert Brothers

[57] ABSTRACT

An electrical power converter system having a power factor correction circuit and a switching power converter. The power factor correction circuit converts the AC line voltage into an unregulated DC voltage referred to as the PFC voltage, which supplies an unregulated DC input voltage to the switching power converter. The switching power converter converts the unregulated DC input voltage into one or more regulated DC output voltages. The PFC voltage automatically adjusts to an appropriate value for achieving the desired power factor correction, converter efficiency, and converter temperature. In a preferred embodiment, the value of the PFC voltage is adjustable in response to a control signal produced by a PFC control circuit. The PFC control circuit measures the peak value of the input line current to determine whether the power factor is acceptable. If the power factor is acceptable, the PFC voltage will be maintained at a relatively low value. If the peak current is too high, indicating a poor power factor, the PFC control circuit will raise the value of the PFC voltage so that the power factor is improved. If excessively high temperatures occur, the PFC control circuit will lower the value of the PFC voltage so that the converter operates more efficiently and lower power losses occur. If highest efficiency operation is required under certain load conditions, the PFC control circuit will also lower the PFC voltage so that the converter operates more efficiently.

5 Claims, 4 Drawing Sheets

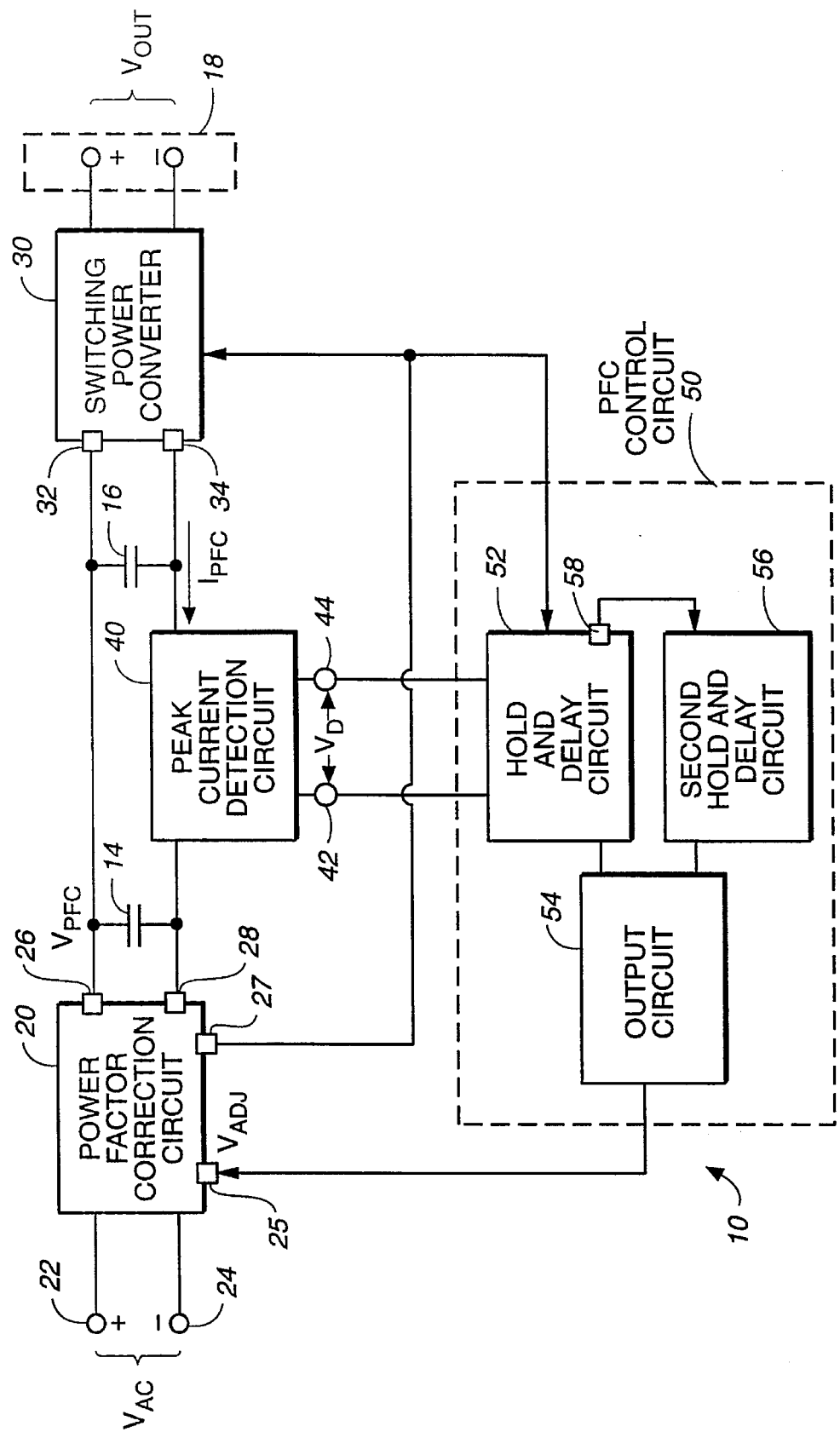
FIG._1

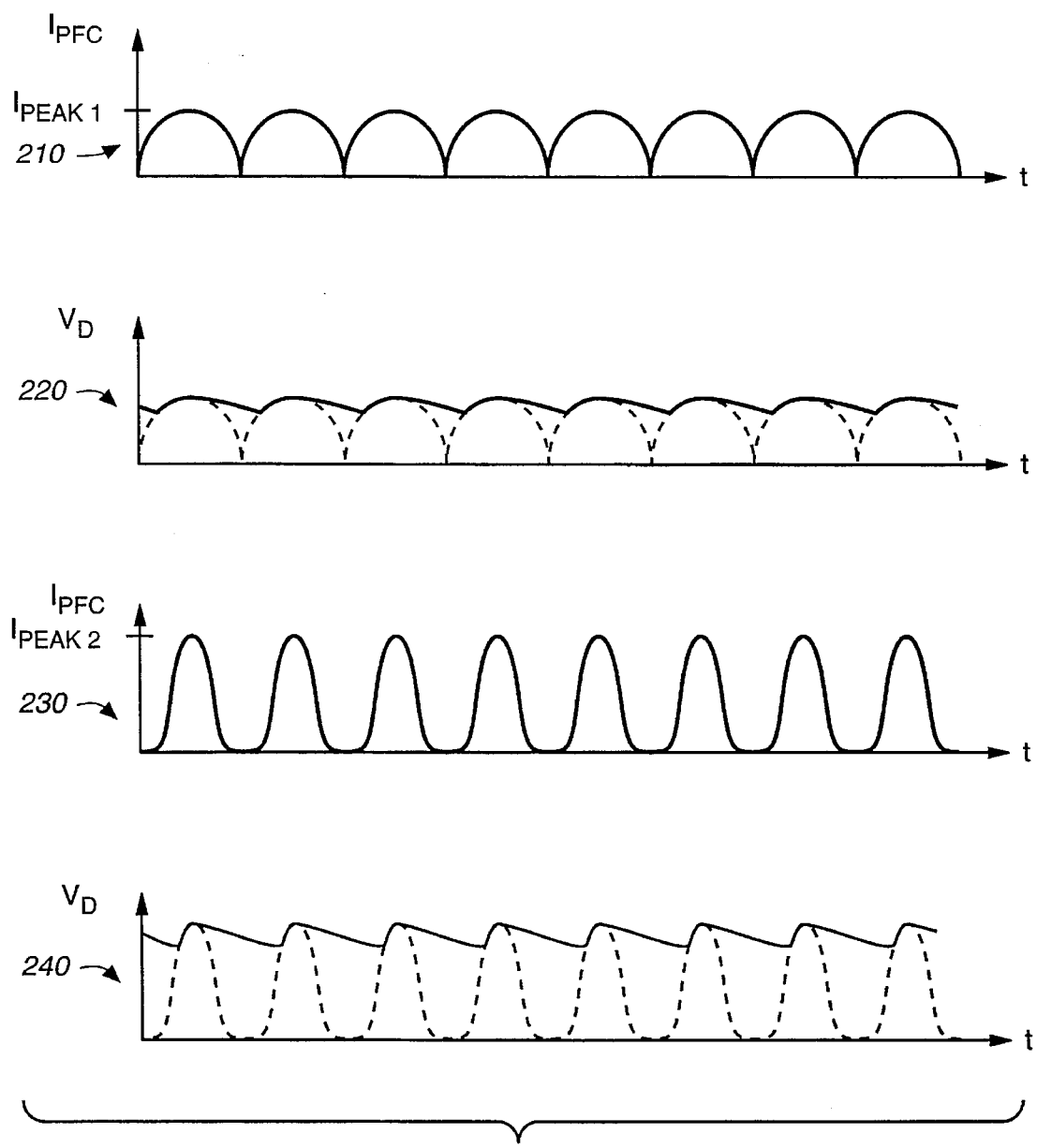
FIG._2

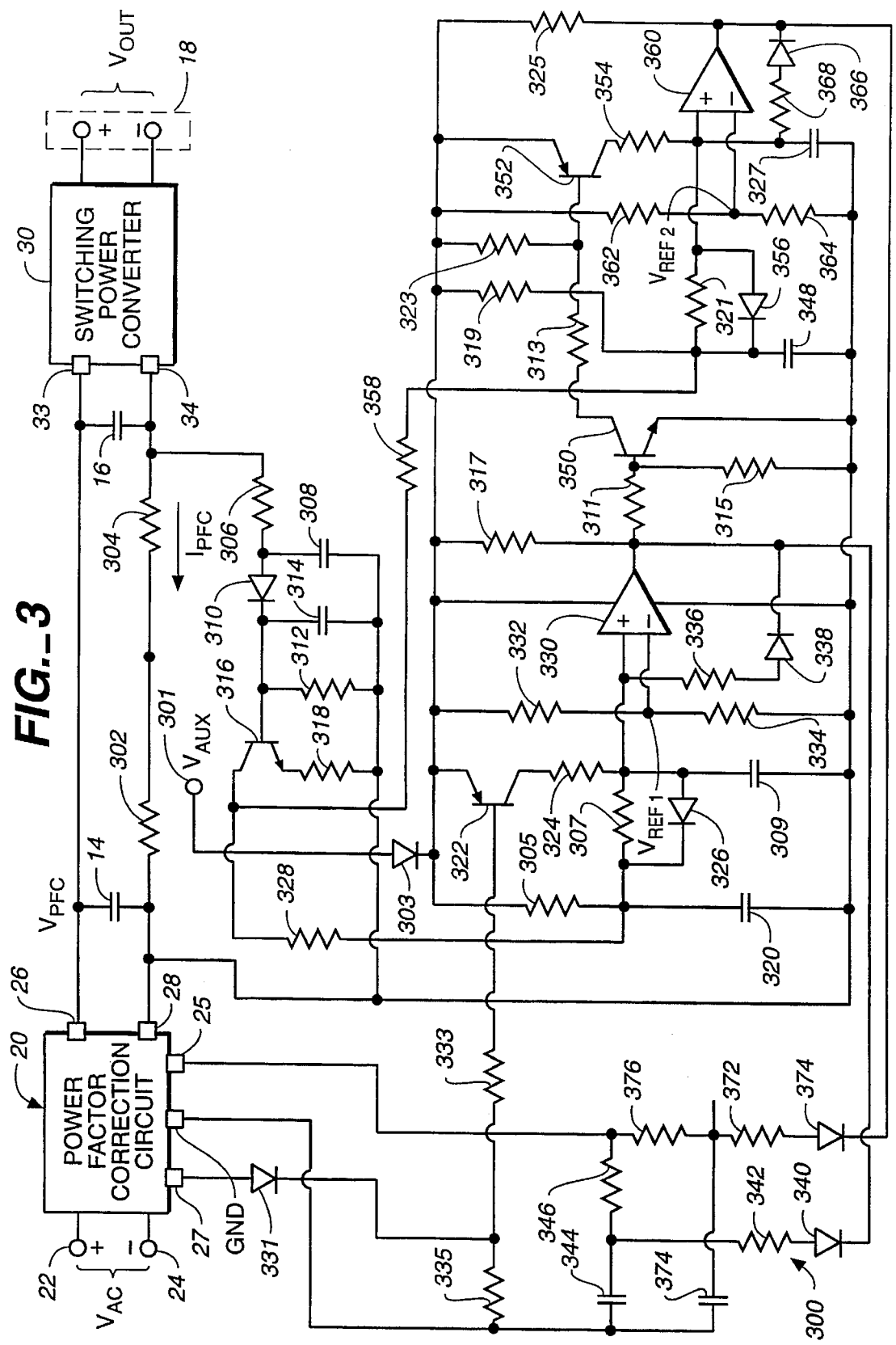
FIG._3

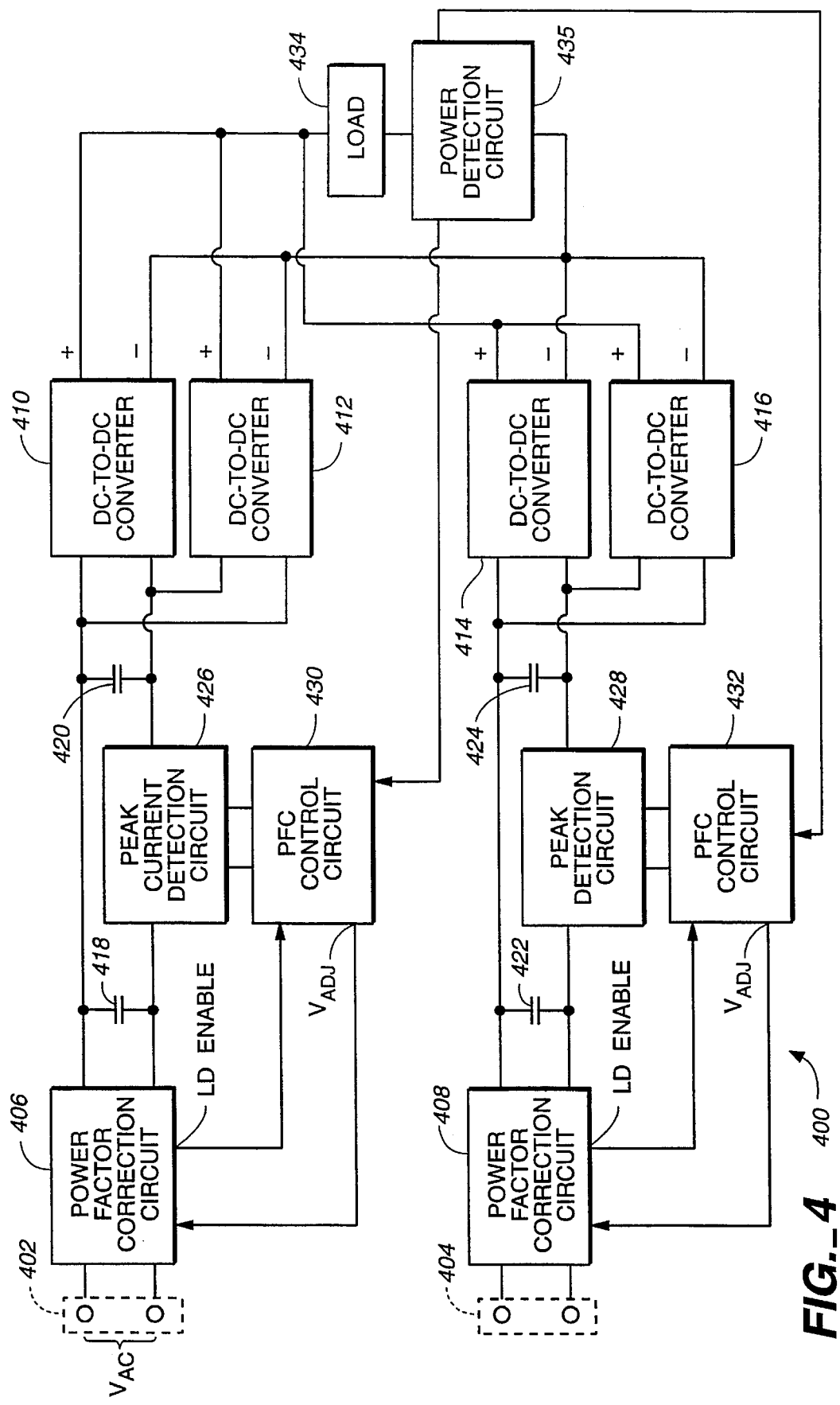
FIG._4

POWER FACTOR CORRECTED ELECTRICAL POWER CONVERTER

FIELD OF THE INVENTION

The present invention relates to electrical power converters having power factor correction circuitry, and more particularly to control systems for power factor correction circuits for switching power supplies.

BACKGROUND OF THE INVENTION

Many electronic devices, such as computers and many household appliances, require one or more regulated DC voltages. The power for such electronic devices is ordinarily supplied by power converters that convert an AC line voltage into the regulated DC voltages required by the devices.

Electrical power converters commonly include a rectifier circuit which converts the AC line voltage to an unregulated DC voltage, also known as a rectified line voltage, and a DC-to-DC converter for converting this unregulated DC voltage into one or more regulated DC output voltages. If a simple rectifier circuit is used, such power converters commonly draw high currents near the peak of the AC voltage cycle, and substantially zero current around the zero-crossing points of the voltage cycle. Thus, the input current drawn by the converter has a highly non-sinusoidal waveform with correspondingly high harmonic content.

As is known in the electrical power art, current harmonics above the fundamental frequency of the voltage do not contribute to the power drawn from a typical AC voltage source, with the result that the actual power drawn by the power supply is lower than the apparent power drawn. The explanation for this phenomenon is straightforward. The apparent power drawn is defined to be the product of the RMS voltage times the RMS current. The actual or "true" power is the integrated product of the instantaneous voltage and current, V*I, over a voltage cycle divided by the cycle's period. As is well-known, the integral of a fundamental harmonic with any other harmonic over one fundamental period is zero. Thus, assuming the input voltage is a sinusoid, the true power is simply the integral of the voltage sinusoid with the fundamental current harmonic, and the higher order current harmonics do not contribute to the true power. By contrast, all of the current harmonics contribute to the RMS value for the current; thus, the higher order harmonics do contribute to the apparent power drawn from the AC voltage source. Similarly, the apparent power is also higher than the true power when there is a phase difference between the voltage sinusoid and the fundamental current harmonic.

The distinction between apparent power and true power is important because power supplies are rated according to the apparent power drawn rather than the true power drawn. As a basis of comparison, the true power and apparent power drawn by a device are divided to form a ratio called the "power factor." Power factors less than about 80 percent can pose barriers to the performance or improvement of many types of electronic devices that operate on direct current, including such devices as personal computers, minicomputers, and appliances using microprocessors. For example, the high current peaks associated with low power factors can cause circuit breakers on the AC line to trip, which limits system design in terms of the functional load it places on the AC line. Additionally, the harmonics associated with the high, non-sinusoidal current peaks often result in power-line distortion, noise, and electromagnetic interference (EMI). In general, improving the power factor of the device reduces the harmonic content and electromagnetic noise.

To address these problems, many power supplies include power factor correction circuitry that is designed to raise power factors and eliminate harmonic distortion. Such circuits are often referred to as power factor correction circuits (abbreviated "PFC"). Power factor correction circuits generally rectify the AC line voltage and produce an unregulated DC voltage (referred to herein as the "PFC voltage") in a manner that has a relatively high power factor within a given range of AC line voltages. A switching power converter then converts the PFC voltage into the required regulated voltages.

It is generally desirable for power factor correction circuits to achieve adequate results over the range of AC line voltages that are standard in various pans of the world (i.e., 85 Vrms to 265 Vrms). It is well known that, in order to achieve adequate power factor correction with a conventional PFC, the PFC voltage generally must be greater than the peak AC line voltage. If the PFC voltage is lower than the peak AC line voltage, adequate power factor correction ordinarily will not occur and the waveform of the input current to the power converter will have high peaks similar to the peaks that would occur if the PFC were replaced by a simple bridge rectifier circuit. To ensure adequate power factor correction over the range of possible input voltages, the average value of the PFC voltage generally is either fixed at a relatively high value (e.g. in excess of 350 volts), or the average PFC voltage has a fixed relationship to the rms value of the AC line voltage (i.e., the PFC voltage is always higher than the RMS line voltage by a fixed factor or increment).

Applicant has discovered that the overall efficiency of the power converter is generally better when the average PFC voltage is lower. In other words, power losses within the power converter are generally greater when the PFC voltage is higher. Consequently, conventional power factor correction circuits having a high fixed PFC voltage can result in undesirably high power losses and correspondingly poor converter efficiency. Similarly, when the PFC voltage varies with the value of the AC line voltage, the PFC voltage is often unnecessarily high for the AC line voltage level, resulting in power losses and poor converter efficiency.

Aside from having relatively poor efficiency, conventional power factor corrected power converters often have additional problems related to unnecessarily high PFC voltages. The high power losses associated with high PFC voltages can result in undesirably high temperatures within the power converter. Additionally, operating the converter at such voltages can result in component failure and poor reliability.

An additional problem is that efficiency may need to be maximized under certain load conditions while power factor correction may be more important under other load conditions. For example, under light load conditions, it is often desirable or required to maximize efficiency without regard to power factor considerations. At higher loads, a high power factor may be required in order to draw sufficient input power. Conventional power factor correction circuitry generally operates in the same manner to correct the power factor under all load conditions. Thus, conventional power factor correction circuits do not accommodate the differences in power factor and efficiency requirements under different load conditions.

One approach to solving some of the problems associated with high PFC voltages might be to design power factor correction circuits that have PFC voltages that are as low as possible. Such power factor correction circuits, however, would not provide adequate power factor correction when the PFC voltage is too low in comparison to the value of the input AC line voltage.

Accordingly, there is a need for an electrical power converter system having a power factor correction circuit with a PFC voltage controlled such that the power converter system is efficient, while enabling adequate power factor correction to be maintained. There is a further need for an electrical power converter wherein the PFC voltage is controlled to reduce power dissipation when excessive temperatures occur or under certain load conditions.

SUMMARY OF THE INVENTION

Broadly stated, the present invention encompasses a power factor corrected electrical power converter having a power factor correction circuit for converting an AC line voltage into an intermediate DC voltage; a DC-to-DC converter for converting said intermediate DC voltage into one or more DC output voltages; and a control circuit for causing said power factor correction circuit to adjust the level of said intermediate DC voltage.

In a preferred embodiment, the intermediate DC voltage is adjusted to maximize efficiency while maintaining adequate power factor correction. Under light load or high temperature conditions, the intermediate DC voltage preferably is maintained at a relatively low value without regard to the power factor.

An object of the present invention is, therefore, to provide an efficient electrical power converter.

Another object of the present invention is to provide an electrical power converter with adequate power factor correction and improved efficiency under a wide range of input AC line voltages.

A further object of the present invention is to provide an electrical power converter having a power factor correction circuit, wherein the voltage produced by the power factor correction circuit is controlled to provide adequate power factor correction and allow the electrical power converter to operate more efficiently than power converters having prior art power factor correction circuits.

Still another object of the present invention is to provide a power converter having a power factor correction circuit, wherein the power factor correction circuit is controlled to reduce power dissipation when excessive temperatures occur.

Yet another object of the present invention is to provide a power converter having a power factor correction circuit, wherein the power factor correction circuit is controlled to reduce power dissipation under light load conditions.

These and other objects of the present invention will become apparent to those skilled in the art from the following detailed description of the invention and preferred embodiments, the accompanying drawings, and the appended claims.

BRIEF DESCRIPTION OF THE DRAWINGS

FIG. 1 is a block diagram of an embodiment of a power factor corrected electrical power converter according to the present invention;

FIG. 2 is a set of timing diagrams showing the value of certain voltages and currents within the power converter shown in FIG. 1.

FIG. 3 is a combined block and schematic diagram of an embodiment of a power converter according to the present invention;

FIG. 4 is a block diagram of a system of electrical power converters according to the present invention.

DETAILED DESCRIPTION OF THE INVENTION AND PREFERRED EMBODIMENTS

The present invention encompasses an electrical power converter system that has a power factor correction circuit and a switching power converter. The power factor correction circuit converts the AC line voltage into an unregulated DC voltage referred to as the PFC voltage, which supplies an unregulated DC input voltage to the switching power converter. The switching power converter converts the unregulated DC input voltage into one or more regulated DC output voltages. The PFC voltage automatically adjusts to an appropriate value for achieving the desired power factor correction, converter efficiency, and converter temperature.

In a preferred embodiment, the value of the PFC voltage is adjusted in response to a control signal produced by a PFC control circuit. The PFC control circuit obtains a measure of the peak value of the input line current to determine whether the power factor is acceptable. If the power factor is acceptable, the PFC voltage will be maintained at a relatively low value. If the peak current is too high, indicating a poor power factor, the PFC control circuit will raise the value of the PFC voltage so that the power factor is improved.

If excessively high temperatures occur, the PFC control circuit preferably will lower the value of the PFC voltage so that the converter operates more efficiently and lower power losses occur. Under light load conditions, the PFC control circuit preferably will also lower the PFC voltage so that the converter operates more efficiently, without regard to the power factor.

A block diagram of one embodiment of a power factor corrected electrical power converter according to the present invention is shown at 10 in FIG. 1. Power factor corrected electrical power converter 10 includes a power factor correction circuit 20, preferably Astec power module APA 100, and a DC-to-DC switching power converter 30, preferably Astec converter module DJ80.

An AC line voltage $V_{AC}$ is received across the positive and negative input terminals of power factor correction circuit 20 (terminals 22 and 24, respectively). Power factor correction circuit 20 converts the input AC line voltage $V_{AC}$ across input terminals 22 and 24 into an unregulated-DC PFC voltage $V_{PFC}$ across the positive and common output terminals (terminals 26 and 28, respectively) of power factor correction circuit 20. PFC voltage $V_{PFC}$ is stored on a capacitor 14 that is coupled between terminals 26 and 28.

PFC voltage $V_{PFC}$ is used to charge a capacitor 16. One end of capacitor 16 is coupled to the positive input terminal 32 of switching power converter 30 and to the end of capacitor 14 that is coupled to terminal 26. The other end of capacitor 16 is coupled to negative input terminal 34 of switching power converter 30. Switching power converter 30 converts the unregulated DC voltage across capacitor 16 into a regulated output voltage $V_{OUT}$ at output port 18.

Power factor corrected electrical power converter 10 also includes a peak current detection circuit 40, which is coupled between terminals 28 and 34, and a PFC control circuit 50. Peak current detection circuit 40 measures the peak value of power factor current $I_{PFC}$, the current conducted toward terminal 28 from capacitor 16, and generates a peak detection voltage $V_D$ that is a function of the peak value of power factor current $I_{PFC}$. Peak detection voltage $V_D$ is coupled to PFC control circuit 50. PFC control circuit 50 generates a control signal $V_{ADJ}$ that is a function of the value of peak detection voltage $V_D$ and indicates whether adequate power factor correction is occurring. The control signal $V_{ADJ}$ is coupled to the PFC voltage adjust terminal 25 of power factor correction circuit 20.

To allow power converter 10 to operate as efficiently as possible, PFC voltage $V_{PFC}$ initially is maintained at a relatively "low" value (e.g., 250 volts DC) that is sufficient to allow adequate power factor correction of input line voltages in the range of 85 to 165 Vrms. It will be appreciated by those skilled in the art that the selected PFC voltage must also be high enough to prevent "brown out" of switching power converter 30.

If adequate power factor correction is not occurring with a "low" PFC voltage, peak current detection circuit 40 will detect high peak currents, generally about three times the value of the peak currents when adequate power factor correction is achieved. Control signal $V_{ADJ}$ will then automatically cause power factor correction circuit 20 to be adjusted such that the PFC voltage $V_{PFC}$ is raised to an "intermediate" voltage level (e.g., 315 volts) that is high enough for adequate power factor correction of input line voltages in the range of 180 to 240 Vrms.

If adequate power factor correction still does not occur, control signal $V_{ADJ}$ will cause power factor correction circuit 20 to be adjusted such that PFC voltage $V_{PFC}$ is raised to a "high" value (e.g., 365 or 375 volts) that is sufficient for adequate power factor correction of conventional input line voltages above 240 Vrms. Thus, power factor correction circuit 20 automatically adjusts to a relatively low PFC voltage level that allows adequate power factor correction for the actual input line voltage level. Power converter 10 (and more specifically power factor correction circuit 20 and switching power converter 30) therefore operates relatively efficiently regardless of the actual input line voltage level.

In a preferred embodiment of the present invention, peak detection voltage $V_D$ is generated across two output terminals 42 and 44 of peak current detection circuit 40. PFC control circuit 50 preferably includes a hold and delay circuit 52 coupled to terminals 42 and 44. Where $V_{PFC}$ is at its lowest value and detection voltage $V_D$ indicates that adequate power factor correction is not occurring, hold and delay circuit 52 causes an output circuit 54 to generate a control signal $V_{ADJ}$ indicating that PFC voltage $V_{PFC}$ should be raised to the intermediate voltage level. If adequate power factor correction still is not occurring, a second hold and delay circuit 56 causes output circuit 54 to generate a control signal indicating that PFC voltage $V_{PFC}$ should be raised to the high voltage range sufficient to allow adequate power factor correction of input line voltages above 240 Vrms.

In a preferred embodiment, the conventional load enable ("LD ENABLE") signal generated by power factor correction circuit 20 at terminal 27 is used both to activate switching power converter 30 in a conventional manner and also to reset hold and delay circuit 52 to allow for a new measurement of the peak value of current $I_{PFC}$ when a line voltage is applied to input terminals 22 and 24. Hold and delay circuit 52 sends a second enable signal from terminal 58 to reset second hold and delay circuit 56.

It will be appreciated that PFC control circuit 50 may be implemented in a variety of manners by those skilled in the art based on the present disclosure. It will also be appreciated that PFC control circuit 50 may be made responsive to system characteristics other than the waveform of current $I_{PFC}$. For example, PFC control circuit 50 may detect the temperature of one or more points within power converter 10 and reduce the value of $V_{PFC}$ when the detected temperature is above a predetermined level. Reducing the value of $V_{PFC}$ will reduce power dissipation in power converter 10, thereby helping to prevent a rise in temperature.

Similarly, it may be desirable to operate power converter 10 as efficiently as possible under certain load conditions (e.g., light load conditions). It will be appreciated that PFC control circuit 50 may detect the power being drawn from output port 18 in a conventional manner, and reduce $V_{PFC}$ to its lowest effective value when highest efficiency operation is required.

Referring now to FIG. 2, exemplary waveforms of PFC current $I_{PFC}$ and peak current detection voltage $V_D$ are shown.

Timing diagram 210 shows a typical waveform for current $I_{PFC}$ when adequate power factor correction is achieved for a given input line voltage level. The peak current $I_{PEAK1}$ under such conditions is relatively low. The waveform of detection voltage $V_D$ under such conditions is shown in timing diagram 220. The peak value of detection voltage $V_D$ is also relatively low.

Timing diagram 230 shows a typical waveform for current $I_{PFC}$ when adequate power factor correction is not being achieved for a given input line voltage level. The peak current $I_{PEAK2}$ under such conditions is relatively high, typically about three times higher than it would be if adequate power factor correction were achieved (i.e., about three times higher than $I_{PEAK1}$). The waveform of detection voltage $V_D$ under such conditions is shown in timing diagram 240. The peak value of detection voltage $V_P$ under such conditions, as shown in diagram 240, is higher than its peak when adequate power factor correction occurs (i.e., the case shown in diagram 220).

A combined block and circuit diagram of one embodiment of power factor corrected electrical power converter 10 is shown at 300 in FIG. 3. The power factor corrected electrical power converter shown in FIG. 3 contains many of the same elements previously described in connection with FIG. 1. They are labeled with identical numbering. The description of these elements have already been described in connection with FIG. 1 and will not be repeated here.

In addition to the elements that were previously described in connection with FIG. 1, the electrical power converter shown in FIG. 3 includes the following elements: resistors 302 and 304 coupled in series between terminals 28 and 34 serving as peak current detection circuit 40; resistor 306 and capacitor 308 coupled in series between terminals 28 and 34, in parallel to the series combination of resistors 302 and 304; a series combination of diode 310 and capacitor 314 coupled in parallel to capacitor 308; resistor 312 coupled in parallel to capacitor 314; and transistor 316 and resistor 318, which are coupled in series with the emitter of transistor 316 coupled to one end of resistor 318. The base of transistor 316 is coupled to diode 310, capacitor 314 and resistor 312, as shown. The other end of resistor 318 is coupled to terminal 28.

In addition, the electrical power converter shown in FIG. 3 includes a series combination of resistor 328 and capacitor 320 that are coupled in parallel to the series combination of transistor 316 and resistor 318; an auxiliary voltage supply 301, preferably having an auxiliary voltage $V_{AUX}$ of approximately 10 V; a series combination of a diode 303 and resistor 305 coupled between auxiliary voltage supply 301 and the node between capacitor 320 and resistor 328. The node between capacitor 320 and resistor 328 is also coupled through resistors 307 and 324 to the collector of a transistor 322, the emitter of which is coupled to diode 303. The base of transistor 322 is fed from terminal 27 through diode 331 and resistor 333. A diode 326 is coupled between resistor 324 and capacitor 320 such that current is enabled to be conducted from resistor 324 to capacitor 320. A capacitor 309 is coupled between resistor 324 and terminal 28. A voltage divider comprising resistors 332 and 334 is coupled between diode 303 and terminal 28.

The electrical power converter shown in FIG. 3 also includes a comparator 330 having a noninverting input coupled to resistor 324, an inverting input coupled to the node between resistor 332 and 334 and an output. A resistor 336 and diode 338 are coupled between the noninverting input of comparator 330 and the output of comparator 330. The output of comparator 330 is coupled through a series combination of diode 340, resistor 342, and resistor 346 to terminal 25.

The output of comparator 330 is also coupled through a resistor 311 to the base of a transistor 350, the emitter of which is coupled to terminal 28 and the collector of which is coupled through a resistor 313 to the base of a transistor 352. A resistor 315 is coupled between the base of transistor 350 and terminal 28 and a resistor 317 is coupled between the output of comparator 330 and diode 303.

A series combination of a resistor 319 and a capacitor 348 are coupled between diode 303 and terminal 28. A resistor 358 is coupled between the collector of transistor 316 and the node between resistor 319 and capacitor 348. A resistor 354 is coupled in series with a parallel combination of diode 356 and resistor 321 between the collector of transistor 352 and the node between resistor 319 and capacitor 348. A resistor 323 is coupled between diode 303 and base of transistor 352. A voltage divider comprising resistors 362 and 364 is coupled between diode 303 and terminal 28.

The electrical power converter shown in FIG. 3 also includes a comparator 360 with a noninverting terminal coupled to the node between resistor 354 and resistor 321, an inverting terminal coupled to the node between resistor 362 and resistor 364, and an output. A series combination of a resistor 368 and a diode 366 is coupled between the noninverting input of comparator 360 and output of comparator 360. A resistor 325 is coupled between the output of comparator 360 and diode 303. A capacitor 327 is coupled between the noninverting input of comparator 360 and terminal 28. The output of comparator 360 is also coupled through a series combination of diode 370, resistor 372 and resistor 376 to terminal 25.

A series combination of a diode 331 and a resistor 333 is coupled between the load enable terminal 27 of power factor correction circuit 20 and the base of transistor 322. A series combination of a resistor 335 and a capacitor 344 are coupled between diode 331 and the node between resistors 346 and 342. The ground (GND) terminal of power factor correction circuit 20 is coupled to the node between resistor 335 and capacitor 344. A capacitor 374 is coupled between the ground terminal of power factor correction circuit 20 and the node between resistors 376 and 372.

In a preferred embodiment of the present invention, the following components having the following preferred values: capacitor 14–150 mF; capacitor 16–220 mF; auxiliary voltage $V_{AUX}$–10 V; resistors 307, 332, 334, 317, 311, 313, 321, 362, 364 and 325–100KΩ. The values for the remaining elements shown in FIG. 3 can be selected in a conventional manner by those skilled in the art to achieve the functionality described below. Where isolation is required between any two elements, depending on the particular power factor correction circuit and the DC converter used, such isolation can be provided in a conventional manner by those skilled in the art.

In power factor corrected electrical power converter 300, the peak level of current $I_{PFC}$ is detected by measuring the voltage across resistors R33 and R34, which are coupled in series between terminals 28 and 34.

The voltage across resistors 302 and 304 is filtered by a high frequency filter circuit including resistor 306 and capacitor 308. When the peak of the filtered voltage is sufficiently high, it is coupled through diode 310 to resistor 312 and capacitor 314. When the peak level of the voltage across resistor 312 and capacitor 314 is sufficiently high, transistor 316 will be turned on, so that current is permitted to be conducted through transistor 316 and resistor 318.

Initially, the voltage across capacitor 320 is approximately equal to the auxiliary voltage $V_{AUX}$. The is true because capacitor 320 has been charged by means of current through transistor 322, resistor 324, and diode 326. When the conventional load enable signal is received, transistor 322 is turned off and capacitor 320 is released so that capacitor 320 initially remains charged.

When transistor 316 has been turned on, current is drawn through resistor 328, thereby discharging capacitor 320. As capacitor 320 discharges, it also lowers the voltage at the noninverting terminal (indicated with a "+" sign) of comparator 330, which was previously also approximately equal to the auxiliary voltage level.

A reference voltage $V_{REF}$ exists at the inverting terminal (indicated by a "–" sign) of comparator 330. Reference voltage $V_{REF}$ is set at half of the auxiliary voltage $V_{AUX}$ by the voltage divider consisting of resistors 332 and 334. When the voltage applied to noninverting input of comparator 330 reaches the level of the reference voltage $V_{REF}$, the output of comparator 330 will change from a positive level to a negative level. Due to the action resistor 336 and diode 338, the output voltage will remain low, regardless of the charge status of capacitor 320.

As a result of the change of state of comparator 330, the PFC voltage is adjusted to a higher level by means of the signal applied to voltage adjust terminal 25 via diode 340, resistor 342, capacitor 344 and resistor 346. Additionally, the low output of comparator 330 releases capacitor 348. Previously, capacitor 348 had been fully charged to the auxiliary voltage $V_{AUX}$ because transistor 350 had turned on transistor 352. Current was therefore fed through transistor 352, resistor 354 and diode 356 to capacitor 348.

If the power factor remains unsatisfactory because the AC line voltage is greater than 240 Vrms, the current $I_{PFC}$ will continue to have high current peaks. Transistor 316 will turn on and will discharge capacitor 348 via resistor 358 toward the level of the second reference voltage $V_{REF2}$, which is applied to the inverting terminal of comparator 360 by the voltage divider comprising resistors 362 and 364. When the noninverting terminal of comparator 360 has a voltage lower that $V_{REF2}$, then the output of comparator 360 will switch to a low level and latch via diode 366 and resistor 368. This again causes the PFC voltage to be increased by means of the signal applied to voltage adjust terminal 25 of power factor correction circuit 20 via diode 370, resistor 372, capacitor 374 and resistor 376.

It will be appreciated that, if efficient operation is required due to a light load or overheating of the power converter, the comparators 330 and 360 can be reset by shorting the resistors 334 and 364 in a conventional manner. This will reduce the PFC voltage $V_{PFC}$ to the lowest and most efficient level.

It will further be appreciated that the precise point at which the PFC voltage $V_{PFC}$ is adjusted can be scaled by placing a variable resistor between diode 310 and resistor 306 (or by making resistor 306 a variable). Adjusting the value of such a resistor will adjust the peak current level necessary to trigger a PFC voltage adjustment.

A block diagram of a power conversion system including a plurality of electrical power convertors according to the present invention is shown at 400 in FIG. 4.

Referring now to FIG. 4, power conversion system 400 includes input ports 402 and 404, power factor correction circuits 406 and 408, DC-to-DC converters 410, 412, 414 and 416, capacitors 418, 420, 422, and 424, peak current detection circuits 426 and 428, PFC control circuits 430 and 432, load 434, and power detection circuit 435.

An AC line voltage is received at input ports 402 and 404. Power factor correction circuit 406 converts the AC line voltage received at input port 402 into an unregulated DC voltage that supplies capacitors 418 and 420. The voltage across capacitor 420 serves as the input voltage for both DC-to-DC converter 410 and DC-to-DC converter 412. DC-to-DC converters 410 and 412 each convert their respective input voltages into a regulated DC voltage that supplies load 434.

Power factor correction circuit 408 converts the AC line voltage received at input port 404 into an unregulated DC voltage that supplies capacitors 422 and 424. The voltage across capacitor 424 serves as the input voltage for both DC-to-DC converter 414 and DC-to-DC converter 416. DC-to-DC converters 414 and 416 each convert their respective input voltages into a regulated DC voltage that supplies load 434.

Peak current detection circuit 426 and PFC control circuit 430 control the level of the output voltage of power factor correction circuit 406 in response to the peak current level detected by circuit 426 in the manner described in connection with the power factor corrected electrical power converter shown in FIG. 1.

Peak current detection circuit 428 and PFC control circuit 432 control the level of the output voltage of power factor correction circuit 408 in response to the peak current level detected by circuit 428 in the manner described in connection with the power factor corrected electrical power converter shown in FIG. 1.

In addition, PFC control circuits 430 and 432 each receive a measure of the power being drawn by load 434 from power detection circuit 435, which may be measured in any conventional manner. PFC control circuits 430 and 432 cause power factor correction circuits 406 and 408 to adjust the level of their output voltages to a relatively low value when the total power being drawn by load 434 is below a predetermined value.

While the invention has been described in connection with the illustrated embodiments, the present invention is not limited to the disclosed embodiments. The present invention encompasses modifications and equivalent arrangements within the scope of the appended claims.

It will be appreciated by those skilled in the art that the present invention may be implemented with any power factor correction circuit having an adjustable PFC voltage. Based on the present disclosure, those skilled in the art will also be enabled to modify other conventional power factor correction circuits so that the PFC voltage is adjustable in the manner required for implementation of the present invention.

What is claimed is:

1. A power factor corrected electrical power converter, comprising:

an input port for receiving an AC line voltage and one or more output ports;

a power factor correction circuit for converting said AC line voltage into an intermediate DC voltage;

a DC-to-DC converter for converting said intermediate DC voltage into one or more DC output voltages at said one or more output ports; and a control circuit for causing said power factor correction circuit to adjust the level of said intermediate DC voltage, said control circuit responsive to a measurement signal comprising a power factor current within said power factor corrected electrical power converter, said power factor current having current peaks, the level of said current peaks being indicative of the value of said power factor of said power factor corrected electrical power converter, said control circuit causing said power factor correction circuit to raise the level of said intermediate DC voltage when a current peak of said power factor current is higher than a predetermined level.

2. The power factor corrected electrical power converter of claim 1, wherein said control circuit is responsive to a temperature level within said power factor corrected electrical power converter.

3. The power factor corrected electrical power converter of claim 2, wherein said control circuit causes said power factor correction circuit to reduce the level of said intermediate DC voltage when said temperature level is above a predetermined value.

4. The power factor corrected electrical power converter of claim 1, wherein said control circuit is responsive to the amount of power drawn from at least one of said output ports.

5. The power factor corrected electrical power converter of claim 4, wherein said control circuit causes said power factor correction circuit to reduce the level of said intermediate DC voltage when the amount of said power drawn from at least one of said output ports is below a predetermined level.

\* \* \* \* \*